United States Patent [19]

Molnar

[11] 4,226,048

[45] Oct. 7, 1980

[54] PLANT GROWING ASSEMBLY

[76] Inventor: Martin A. Molnar, Apt. #3, 1006 W. Loyola Ave., Chicago, Ill. 60626

[21] Appl. No.: 858,569

[22] Filed: Dec. 8, 1977

[51] Int. Cl.² .................................. A01G 27/00
[52] U.S. Cl. ................................................ 47/81
[58] Field of Search .................. 206/423; 47/19, 25, 47/32, 33, 66, 79, 80, 81, 41.11

[56] References Cited

U.S. PATENT DOCUMENTS

| | | | |
|---|---|---|---|
| 915,897 | 3/1909 | Skorness | 47/32 |
| 1,247,766 | 11/1917 | White | 47/81 |
| 1,873,693 | 8/1932 | Whitfield et al. | 47/41.11 X |
| 1,989,403 | 1/1935 | Dauernhiem | 47/80 X |
| 2,695,474 | 11/1954 | Barstow | 47/81 |
| 2,810,235 | 10/1957 | Magid | 47/81 |
| 3,287,851 | 11/1966 | Cramer | 47/25 |
| 3,852,912 | 12/1974 | Diller | 206/423 X |
| 3,866,351 | 2/1975 | Cobia | 47/81 |

FOREIGN PATENT DOCUMENTS

| | | | |
|---|---|---|---|
| 1064281 | 8/1959 | Fed. Rep. of Germany | 47/81 |
| 2126629 | 12/1971 | Fed. Rep. of Germany | 47/79 |
| 933334 | 4/1948 | France | 47/19 |
| 1146120 | 3/1969 | United Kingdom | 47/80 |

*Primary Examiner*—Edgar S. Burr
*Assistant Examiner*—James R. Feyrer
*Attorney, Agent, or Firm*—Scott R. Foster

[57] ABSTRACT

A plant growing assembly comprising a first housing adapted to retain water therein, the housing having an opening in an upper surface thereof, a second housing adapted to retain a plant therein, the opening being shaped complementarily to the second housing and being adapted to receive and retain the second housing therein, a support in the first housing for supporting the second housing at the bottom of the second housing, and a water transfer element extending through an opening in the second housing and interconnecting the interior of the first housing and the interior of the second housing, whereby to transfer water in the first housing to the plant in the second housing.

1 Claim, 4 Drawing Figures

PLANT GROWING ASSEMBLY

BACKGROUND OF THE INVENTION

1. Field of the Invention

This invention relates to plant receptacles and is directed more particularly to a plant growing assembly.

2. Description of the Prior Art

Devices intended to receive and retain plants and encourage the growth thereof are generally known in the art. Examples of such devices may be seen in U.S. Pat. No. 1,139,883 issued May 18, 1915 to A. J. Martin; U.S. Pat. No. 2,344,202 issued Mar. 14, 1944 to E. Carlson; U.S. Pat. No. 2,556,522 issued June 12, 1951 to J. Cienfuegos, Jr.; U.S. Pat. No. 2,638,716 issued May 19, 1953 to F. Luipersbek; U.S. Pat. No. 2,713,752 issued July 26, 1955 to V. Sobol; and U.S. Pat. No. 3,896,586 issued July 29, 1975 to E. N. Caldwell.

SUMMARY OF THE INVENTION

An object of the present invention is to provide a plant growing assembly which will encourage the growth of young plants and be relatively non-complex and economical in manufacture and convenient and easy to use.

With the above and other objects in view, as will hereinafter appear, a feature of the present invention is the provision of a plant growing assembly comprising a first housing adapted to retain water therein, the first housing having an opening in an upper surface thereof, a second housing adapted to retain a plant therein, the opening being shaped complementarily to the second housing and being adapted to receive and retain the second housing therein, support means in the first housing for supporting the second housing at the bottom of the second housing, and a water transfer element extending through an opening in the second housing and interconnecting the interior of the first housing and the interior of the second housing, whereby to transfer water in the first housing to the plant in the second housing.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

DESCRIPTION OF THE DRAWINGS

Reference is made to the accompanying drawings in which is shown an illustrative embodiment of the invention from which its novel features and advantages will be apparent.

DESCRIPTION OF THE PREFERRED EMBODIMENTS

Figure 2:
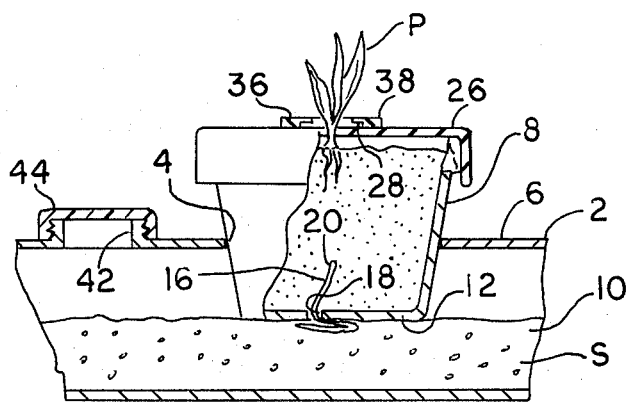
FIG. 2 is a sectional view taken along line II—II of FIG. 1.
Figure 4:
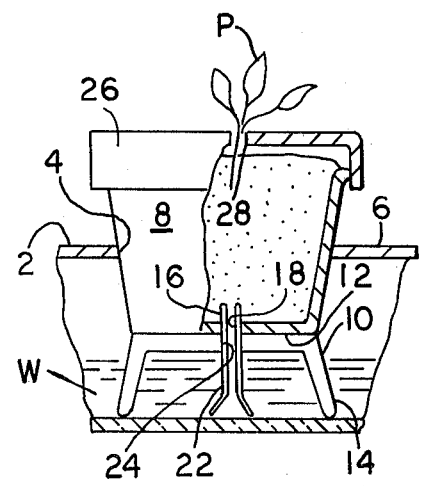
FIG. 4 is a sectional view, partly broken away, illustrative of another feature of the invention.

Referring to the drawings, it will be seen that the illustrative plant growing assembly comprises a first housing 2 adapted to retain water therein. The housing 2 may retain a reservoir of water W, as shown in FIG. 4, or may retain a sponge-like material S, as shown in FIG. 2, the sponge being impregnated with water.

Figure 1:
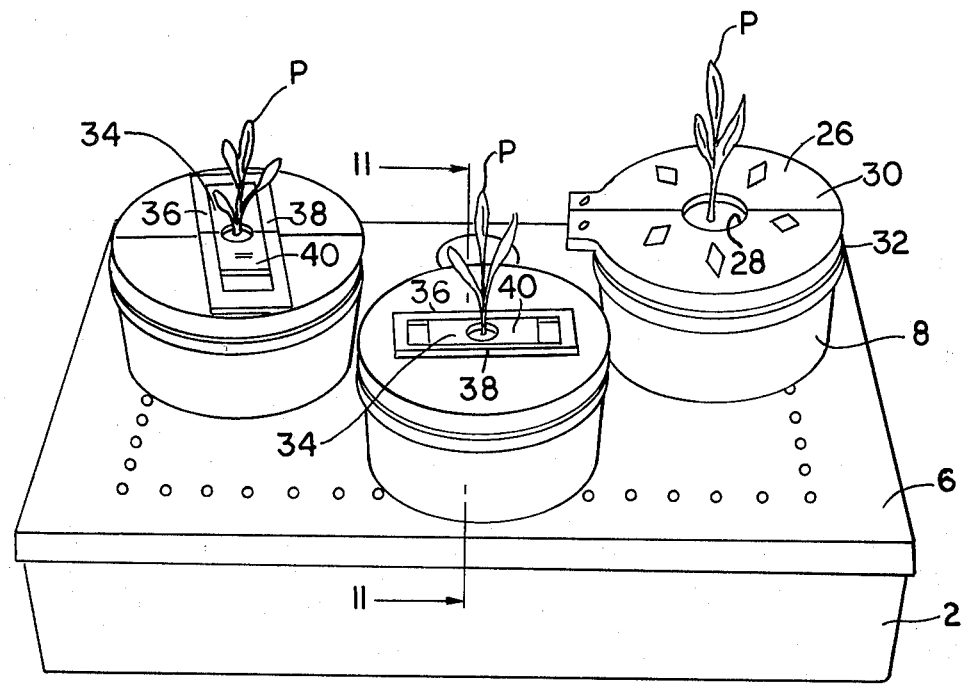
FIG. 1 is a perspective view of one form of plant growing assembly illustrative of an embodiment of the invention.

The first housing 2 is provided with an opening 4 is an upper surface 6 thereof. The assembly includes a second housing 8 adapted to retain a plant P therein. The opening 4 is shaped complementarily to the second housing 8 and is adapted to receive and retain the second housing, or a plurality thereof, as shown in FIGS. 1, 2, and 4. A support means 10 is provided in the first housing 2 for supporting the second housing 8 at the bottom 12 of the second housing. In instances in which the first housing 2 is provided with a sponge S, the sponge acts as the support means 10 for the second housing 8. In instances in which the first housing 2 contains water W, as shown in FIG. 4, the support means 10 may comprise a frame member 14 operative to support the second housing 8 thereon.

A water transfer element 16 extends through an opening 18 in the bottom 12 of the second housing 8 and interconnects the interior of the first housing 2 and the interior of the second housing 8, to facilitate transfer of water from the first housing to the plant in the second housing. In the embodiment shown in FIG. 2, the water transfer element may comprise a wick means 20. In the embodiment shown in FIG. 4, the water transfer element 16 may comprise a capillary tube 22. In the latter instance, the frame member 14 is provided with a centrally disposed hole 24 in alignment with the opening 18 to permit passage of the capillary tube 22 therethrough.

Figure 3:
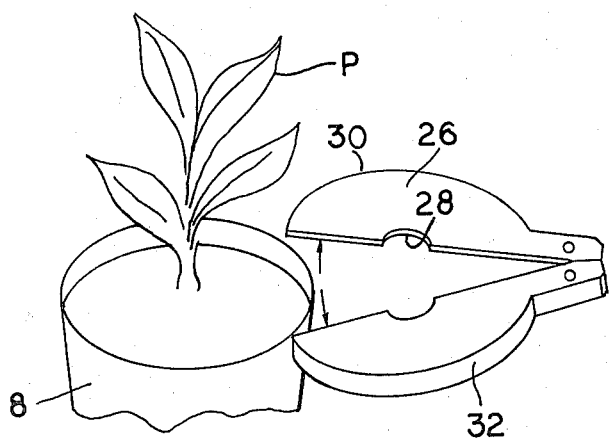
FIG. 3 is a perspective view illustrative of a feature of the invention.

The second housing 8 may comprise a housing in the shape of a plant pot including a top member 26 disposed thereon. The top member 26 is provided with an aperture 28 and includes means for selectively varying the size of the aperture. In one embodiment, the top member 26 includes first and second portions 30, 32 pivotally connected so that the portions 30, 32 may be pivoted outwardly from each other, as shown in FIG. 3, to provide an opening larger than would otherwise be afforded by the aperture 28.

In another embodiment, there is provided a means for selectively varying the size of the top aperture which comprises a first cover member 34 slidably disposed between the first and second tracks 36, 38 on the top member 26. The tracks 36, 38 are disposed on opposite sides of the aperture 28 (FIG. 2). The first cover member 34 is slidably movable between the tracks 36, 38 to selectively cover or uncover portions of the aperture 28. Preferably, there is disposed between the tracks 36, 38 a second cover member 40 slidably disposed in a position opposed to the first cover member 34.

The first housing 2 may be provided with an inlet 42, having a cap 44 thereon, the inlet being for the purpose of adding water to the first housing 2. In use, the first housing receives a supply of water. A second housing having a plant therein is then disposed in one of the openings on the upper surface of the first housing. The second housing comes to rest upon the sponge S or the frame member 14. After a period of growth, it may be desirable to enlarge the opening in the top of the second housing. The means for selectively varying the size of the top opening may then be manipulated, be it a pivotal connection means as above described, or a slide means as above described, to enlarge the opening in the top of the second housing.

It is to be understood that the present invention is by no means limited to the particular construction herein disclosed and/or shown in the drawings, but also comprises any modifications or equivalents within the scope of the disclosure.

Having thus described my invention what I claim as new and desire to secure by Letters Patent of the United States is:

1. A plant growing assembly comprising a first housing adapted to retain water therein, said first housing having an opening in an upper surface thereof, a second housing adapted to retain a plant therein, said opening being shaped complementarily to said second housing and being adapted to receive and retain said second housing therein, a frame disposed in said first housing for supporting said second housing at the bottom of said second housing at a position removed from the bottom of said first housing, said frame having a first hole therein in alignment with said opening, a water transfer element extending through a second hole in the bottom of said second housing and said first hole and interconnecting the interior of said first housing proximate the bottom thereof and the interior of said second housing proximate the bottom thereof, to transfer water in said first housing to said plant in said second housing, and a top disposed on said second housing, said top comprising a planar top surface having an elongated opening therein, a first cover member slidably disposed between first and second tracks on said top, said tracks being disposed on opposite lengthwise sides of said elongated opening and in parallel coextensive arrangement, said first cover member being slidably movable over said elongated opening in said tracks, said first cover member having a first recess on a first edge thereof facing a central portion of said second housing, and a second cover member slidably disposed over said elongated opening between said tracks and having a second edge thereof opposed to said first edge and having a second recess therein in alignment with and complementary to said first recess, said first and second recesses forming a third hole upon abutment of said first and second edges, the third hole being adapted to be disposed about said plant, said cover members being adapted for slidable movement in said tracks apart from each other to accommodate growth of said plant, and stop means at the ends of said tracks to restrict movement of said cover members to positions within the perimeter of said planar top surface.

* * * * *